though2,994,703
Patented Aug. 1, 1961

2,994,703
SUCCINIMIDE COMPOUNDS
Charles A. Miller, Detroit, and Loren M. Long, Grosse Pointe Woods, Mich., assignors to Parke, Davis & Company, Detroit, Mich., a corporation of Michigan
No Drawing. Filed July 6, 1959, Ser. No. 824,947
1 Claim. (Cl. 260—326.5)

This invention relates to a new succinimide compound having superior anticonvulsant properties. More particularly, the invention relates to N-methyl-α-ethyl-α-methylsuccinimide of the formula

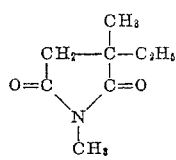

The compound of this invention can be produced by reacting α-ethyl-α-methylsuccinic acid or α-ethyl-α-methylsuccinic anhydride with methylamine followed by heating the intermediate reaction product to produce the desired N-methyl-α-ethyl-α-methylsuccinimide. When α-ethyl-α-methylsuccinic acid is employed as a starting material, the intermediate reaction product is a salt of the acid and methylamine. Upon heating this salt, preferably at about 150–250° C., it undergoes dehydration and ring closure to yield the desired succinimide. When α-ethyl-α-methylsuccinic anhydride is used as a starting material, the intermediate reaction product is a half amide, that is a substituted succinamic acid or a salt thereof. Upon heating, preferably in the presence of a dehydrating agent such as acetyl chloride or acetic anhydride, the half amide undergoes dehydration and ring closure to yield the desired succinimide. The reaction of the substituted succinic acid or anhydride is carried out with at least one equivalent and preferably an excess of methylamine or aqueous methylamine; if desired, any of a variety of unreactive solvents can be employed in the process.

N-methyl-α-ethyl-α-methylsuccinimide is an anti-convulsant having exceptional properties and is of particular value in the treatment of petit mal epilepsy. When tested in the standard anti-pentamethylenetetrazole or anti-Metrazol® test by which agents intended for use in the treatment of petit mal epilepsy are customarily screened, it exhibits high activity as do certain other succinimides. Additionally, in clinical use the compound unexpectedly departs from the pattern set by succinimide derivatives already employed in clinical medicine and exhibits unpredictable advantages. For example, when the clinical effect of N-methyl-α-ethyl-α-methylsuccinimide is compared with the clinical effect of N-methyl-α-phenylsuccinimide (a succinimide derivative commonly employed in the treatment of petit mal epilepsy), a different pattern of behavior is observed. First, a high percentage of cases which fail to respond satisfactorily to treatment with N-methyl-α-phenylsuccinimide are rendered completely free of symptoms with N-methyl-α-ethyl-α-methylsuccinimide. The incidence of undesirable side effects is substantially reduced from that encountered with other succinimide preparations. Moreover, it is clear that the different response patterns encountered with N-methyl-α-ethyl-α-methylsuccinimide and with N-methyl-α-phenylsuccinimide are not merely subjective or symptomatic in origin since the former substance is more successful in normalizing the electroencephalograms of the patients undergoing treatment.

The novel succinimide compound of this invention therefore affords a substantial advance over succinimide anticonvulsants already known in the art.

For use in clinical medicine N-methyl-α-ethyl-α-methylsuccinimide is provided in dosage unit form with pharmaceutical carriers or diluents. Dosage unit forms for oral administration are particularly suitable and for this purpose the N-methyl-α-ethyl-α-methylsuccinimide can be incorporated into tablets, powders, capsules, solutions, suspensions and similar forms. The medicament can be incorporated with pharmaceutically-acceptable solid or liquid diluents.

The compositions are commonly administered orally to provide a total daily dose of about 0.1 to 5.0 g. of N-methyl-α-ethyl-α-methylsuccinimide, optionally in divided portions. The dose is adjusted within the indicated range to the needs of the individual patient by first administering a daily dose of about 0.1 to 0.5 g. and then increasing the dose until satisfactory control of seizures is obtained or undesirable side-effects intervene.

The invention is illustrated, but not limited, by the following example:

*Example*

A mixture consisting of 8 g. of α-ethyl-α-methylsuccinic acid and 10 ml. of 40% aqueous methylamine solution is heated until the internal temperature reaches 180° C. and all distillation has ceased. The residue is distilled in vacuo and the desired product, N-methyl-α-ethyl-α-methylsuccinimide, is collected; B.P. 111° C. at 15 mm.

This is a continuation-in-part of copending application Serial No. 311,798, filed September 26, 1952, now abandoned.

We claim:
N-methyl-α-ethyl-α-methylsuccinimide.

References Cited in the file of this patent
UNITED STATES PATENTS 2,614,106    Stoughton _____ Oct. 14, 1952